United States Patent
Poledna et al.

(10) Patent No.: US 10,397,081 B2
(45) Date of Patent: Aug. 27, 2019

(54) DISTRIBUTED REAL-TIME COMPUTER SYSTEM AND METHOD FOR FORCING FAIL-SILENT BEHAVIOR OF A DISTRIBUTED REAL-TIME COMPUTER SYSTEM

(71) Applicant: FTS Computertechnik GmbH, Vienna (AT)

(72) Inventors: Stefan Poledna, Klosterneuburg (AT); Hermann Kopetz, Baden (AT)

(73) Assignee: TTTech Auto AG, Vienna (AT)

( * ) Notice: Subject to any disclaimer, the term of this patent is extended or adjusted under 35 U.S.C. 154(b) by 372 days.

(21) Appl. No.: 15/188,029

(22) Filed: Jun. 21, 2016

(65) Prior Publication Data
US 2016/0380858 A1    Dec. 29, 2016

(30) Foreign Application Priority Data
Jun. 23, 2015  (AT) .................. 50528/2015

(51) Int. Cl.

| | |
|---|---|
| *G06F 15/173* | (2006.01) |
| *H04L 12/26* | (2006.01) |
| *G05B 9/03* | (2006.01) |
| *G06F 11/07* | (2006.01) |
| *G06F 11/16* | (2006.01) |
| *H04L 1/20* | (2006.01) |

(Continued)

(52) U.S. Cl.
CPC ......... *H04L 43/0847* (2013.01); *G05B 9/03* (2013.01); *G06F 11/0709* (2013.01); *G06F 11/1629* (2013.01); *H04L 1/20* (2013.01); *H04L 1/22* (2013.01); *H04L 41/0659* (2013.01); *H04L 67/10* (2013.01); *B60T 2270/40* (2013.01); *G05B 2219/24181* (2013.01); *G05B 2219/24187* (2013.01); *G05B 2219/24189* (2013.01)

(58) Field of Classification Search
CPC .......... G05B 9/03; G06F 11/1629; H04L 1/22
USPC .................................. 709/201–203, 223–224
See application file for complete search history.

(56) References Cited

U.S. PATENT DOCUMENTS

| | | | | |
|---|---|---|---|---|
| 7,472,051 B2* | 12/2008 | Mariani | ................... | G06F 11/27 703/13 |
| 7,536,595 B1* | 5/2009 | Hiltunen | ............. | G06F 11/0709 714/26 |

(Continued)

*Primary Examiner* — Bharat Barot
(74) *Attorney, Agent, or Firm* — Eversheds Sutherland (US) LLP

(57) ABSTRACT

The invention relates to a method for forcing fail-silent behavior of a periodically functioning, distributed real-time computer system, which real-time computer system comprises at least two redundant NSCFCUs. At the beginning of a frame, the at least two redundant NSCFCUs (110, 111) are supplied with the same input data, wherein each of the redundant NSCFCUs calculates a result, preferably by means of a deterministic algorithm, particularly from the input data, and wherein this result is packed into a CSDP with an end-to-end signature, and wherein the CSDPs of the NSCFCUs (110, 111) are transmitted to an SCFCU (130), and wherein the SCFCU (130) checks whether the bit patterns of the received CSDPs are identical, and, if disparity of the bit patterns is found, prevents further transmission of the CSDPs, particularly those CSDPs in which disparity was found. Furthermore, the invention relates to a periodically functioning, distributed real-time computer system.

14 Claims, 1 Drawing Sheet

Figure 1:
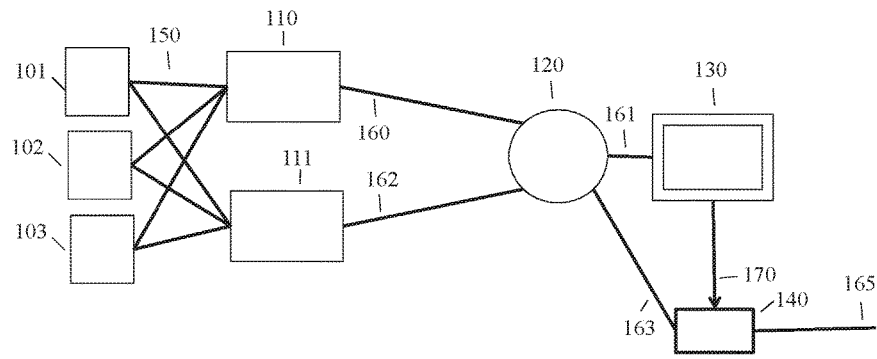

(51) Int. Cl.
*H04L 1/22* (2006.01)
*H04L 12/24* (2006.01)
*H04L 29/08* (2006.01)

(56) References Cited

U.S. PATENT DOCUMENTS

| | | | | |
|---|---|---|---|---|
| 7,694,250 | B2 * | 4/2010 | Boutin | G05B 9/03 |
| | | | | 700/21 |
| 10,241,858 | B2 * | 3/2019 | Kopetz | G06F 11/1641 |
| 2006/0074500 | A1 * | 4/2006 | Naik | G05B 9/03 |
| | | | | 700/21 |
| 2010/0318652 | A1 * | 12/2010 | Samba | H04L 41/5009 |
| | | | | 709/224 |
| 2017/0262330 | A1 * | 9/2017 | Kopetz | G06F 11/0739 |

* cited by examiner

DISTRIBUTED REAL-TIME COMPUTER SYSTEM AND METHOD FOR FORCING FAIL-SILENT BEHAVIOR OF A DISTRIBUTED REAL-TIME COMPUTER SYSTEM

This application claims priority to Austrian Patent Application A 50528/2015, filed Jun. 23, 2015, which is incorporated herein by reference in its entirety.

The invention relates to a method for forcing fail-silent behavior of a periodically functioning, distributed real-time computer system, which real-time computer system comprises at least two redundant NSCFCUs (non-self-checking fault-containment units).

Furthermore, the invention relates to a real-time computer system, particularly a periodically functioning, distributed real-time computer system, which can be connected with one or more sensors.

The invention lies within the sector of computer technology. It describes a method and an apparatus for forcing fail-silent behavior of a distributed real-time computer system.

In many applications of real-time systems—e.g. computer-controlled piloted driving of a motor vehicle—it must be guaranteed that even after occurrence of a transient or permanent failure in the computer hardware, the safety of the application is not impaired.

In past years—due to rapid development in hardware technology—very high-performance systems-on-a-chip (SoCs) were developed in the sector of consumer electronics; these are produced in large numbers and offered for sale on the market at relatively low cost. An example of such a SoC is SnapDragon from the Qualcomm company [5].

These SoCs are produced using very advanced production technology—for example with a structure size of 20 nm. With these extremely small structures, the increased occurrence of transient hardware failures cannot be excluded [3].

An architecture for a safety-relevant computer system must guarantee the safety of the application even after the occurrence of such a hardware failure.

It is a task of the present invention to indicate a solution as to how the aforementioned goal can be achieved under economically reasonable general conditions.

This task is accomplished with a method as mentioned initially, in that according to the invention, a global time is made available by the distributed real-time computer system, which time establishes the beginning of a frame, and wherein the at least two redundant NSCFCUs are supplied with the same input data at the beginning of a frame, wherein each of the redundant NSCFCUs calculates a result, preferably by means of a deterministic algorithm, particularly from the input data, and wherein this result is packed into a CSDP (closed signed data packet) with an end-to-end signature, and wherein the CSDPs of the NSCFCU are transmitted to an SCFCU (self-checking fault-containment unit) at a tick of the global time that has been established a priori, and wherein the SCFCU checks whether the bit patterns of the received CSDPs are identical, and, if disparity of the bit patterns is found, prevents further transmission of the CSDPs, particularly those CSDPs in which disparity was found.

Furthermore, the task stated above is accomplished with a real-time computer system as mentioned initially, particularly a distributed, periodically functioning real-time computer system, in which, according to the invention, in order to force fail-silent behavior, the real-time computer system comprises at least two redundant NSCFCUs and an SCFCU, wherein the sensor can be connected with each of the NSCFCUs, preferably by way of at least one communication channel, in each instance, and wherein the at least two redundant NSCFCUs, which are supplied with the same input data by the sensor(s), preferably at the beginning of a frame, are set up for calculating a result, in each instance, preferably by means of a deterministic algorithm, packing this result into a CSDP (closed signed data packet) with an end-to-end signature, and wherein the SCFCU is set up for receiving CSDPs of the NSCFCUs, particularly CSDPs of the NSCFCUs based on the same input data, and for checking whether the bit patterns of the received CSDPs are identical, and the SCFCU is furthermore set up for preventing further transmission of the CSDPs if disparity of the bit patterns was found, particularly of those CSDPs in which disparity was found.

If the SCFCU therefore recognizes disparity in CSDPs that are based on the same input data, then at least one of these CSDPs has failed, and further transmission of these CSDPs, for which disparity was found, is prevented. In this regard, "further" transmission is understood to be transmission to further components in the real-time computer system or outside of the real-time computer system.

A deterministic algorithm is an algorithm that always produces the same output data or results from the same input data.

The present invention discloses a real-time computer system and method, in which the safety of the application can be maintained even after occurrence of a failure in a SoC, by means of the provision of redundant SoCs that demonstrate different failure behavior.

Fundamentally, a distinction must be made between two application classes, fail-safe applications and fail-operational applications.

In a fail-safe application, there is a safe state in the overall system, which can be activated in the event of a failure. In these applications, the computer system must either function correctly or not have any output, i.e. it must demonstrate fail-silent behavior.

For example, functioning of the mechanical braking system is the safe state of the computer-controlled anti-lock braking system in a vehicle. If a failure is recognized in the computer-controlled anti-lock braking system, then the computer-controlled anti-lock braking function is shut off. Functioning of the mechanical braking system continues to be available.

In a periodically time-controlled system, it has been established a priori at what recurring output time points a result of the computer system must be present. If a fail-silent failure occurs, and if the computer system does not produce a result at the planned output time point, this failure is recognized with a very short failure recognition latency, immediately after the planned output time point.

In a fail-operational application, for example in the control of an aircraft, there is no safe state. In this case, the computer system must function even after a failure has occurred. A fail-operational computer system can be implemented by means of the provision of two redundant, independent fail-silent computer systems [2, p. 156].

It is assumed that the proposed fail-silent system consists of a number of components that exchange data by way of messages. The term component is understood to mean a physical unit that can process or transport data.

A component is a Fault-Containment Unit (FCU) if the direct consequences of a failure cause remain restricted exclusively to this component [2, p. 137]. The indirect consequences of a failure of an FCU are the absence of an expected message or a defective message. An FCU that does not send a message in the case of a failure is called a self-checking FCU (fail-silent FCU or self-checking FCU, abbreviated SCFCU).

A failure of an FCU can be caused either by a physical failure of the hardware (hardware failure) or by a failure in design (software failure).

If the software that is used in an FCU is so simple that it can be formally checked and comprehensively tested, the assumption is justified that design failures will not occur during operation.

A distinction is made between the following three FCU types:

| Designation | Failure type | Example |
| --- | --- | --- |
| NSCFCU_1 non-self-checking FCU_1 | any | SoC from consumer electronics, can produce arbitrary incorrect results in the event of failure. |
| NSCFCU_2 non-self-checking FCU_2 | any, with restrictions | Message distribution unit can transmit messages incorrectly, but cannot consistently change the message content. |
| SCFCU self-checking FCU | fail-silent | Self-checking (self-checking) chip from real-time data processing terminates when a failure occurs. |

An NSCFCU_1 produces closed, signed data packets (closed signed data packets, abbreviated CSDP). We refer to an SDP (signed data packet) as being closed if the data content is secured by means of an end-to-end signature and if the signature is part of the data packet. The algorithm that calculates the end-to-end signature is known only to the sender and the recipient of the user data.

An NSCFCU_2 relays CSDPs but has no knowledge of the algorithm that calculates the end-to-end signature. It is assumed that any hardware failure in an NSCFCU_2, which changes the bit pattern of a CSDP, can be recognized if a recipient checks whether the payload (payload) of the data packet agrees with the end-to-end signature.

An SCFCU (self-checking FCU) consists of two physical hardware units, the results of which are compared by a self-checking checker [4]. If the results of the two physical units are different, then the SCFCU prevents output of the defective CSDP. If a failure occurs in an SCFCU, then the system is shut off. In this manner, fail-silent behavior of the system is implemented even if a hardware failure occurs.

In the present invention, the periodic input data are transferred simultaneously—i.e. at the same tick of the global time—to two independent NSCFCU_1s for calculation, wherein each of the two NSCFCU_1s produces a CSDP as the output, using the same, preferably deterministic algorithm, in each instance. These two CSDPs are transmitted to an SCFCU, preferably by an NSCFCU_2 described above. The SCFCU checks whether bit parity of the two CSDPs exists. If the bit patterns of the two CSDPs differ from one another, then the SCFCU shuts off a transceiver, for example, which applies the signals of the CSDPs to a serial output line, for example.

It can be advantageous for the invention, i.e. for the method or real-time computer system according to the invention, if the SCFCU prevents further transmission of the other CSDP in the event that a CSDP is not received by an NSCFCU;

the SCFCU transmits a release signal to a transceiver in the failure-free case, for example by way of a control line, and, in the event of a failure, shuts this release signal off or does not transmit it, so that further transmission of the CSDPs to subsequent components, for example transmission by way of a communication channel, is prevented;

in the event of failure of the SCFCU, further transmission of the CSDPs to the subsequent components is prevented;

in the event of failure of the SCFCU and thereby of the release signal on the control line, the transceiver prevents further transmission of the CSDPs to the subsequent components, by way of the communication channel;

a time-controlled message relay unit delays output of the CSDPs to the transceiver until the SCFCU has completed the comparison of the redundant CSDPs;

the SCFCU transmits failure messages to a monitor component, by way of a communication channel;

the real-time computer system comprises a distributor unit, wherein an NSCFCU is connected with the distributor unit by way of a communication channel, and a further NSCFCU is connected with the distributor unit by way of a further communication channel;

the real-time computer system comprises a transceiver, wherein the distributor unit is connected with the transceiver by way of a communication channel and connected with the SCFCU by way of a communication channel, and wherein a control line leads from the SCFCU to the transceiver;

a protocol converter is disposed in a communication channel of the real-time computer system, which channel connects an NSCFCU with the distributor unit;

a protocol converter is disposed in the communication channel of the real-time computer system, which channel connects the distributor unit with the transceiver;

the two redundant NSCFCUs of the real-time computer system are combined in a physical unit;

the distributor unit, the SCFCU, and the protocol converters of the real-time computer system are combined in a physical unit.

The advantageous further developments mentioned above can be implemented on their own, in each instance, or in any desired combination.

In the following, the invention will be explained in greater detail using an exemplary embodiment. In this embodiment, FIG. 1 shows the components of a distributed computer system and the connections, and FIG. 2 shows a possible structure of the system in physical units.

The following concrete example deals with one of the many possible implementations of the new method.

Figure 2:
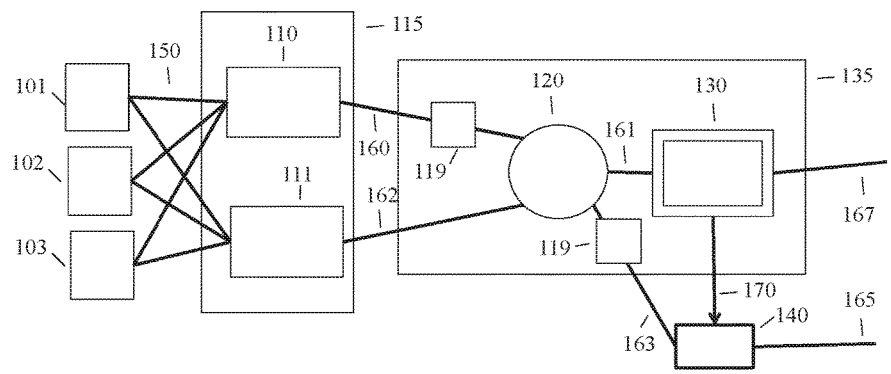

In FIG. 1, three sensors, the sensors 101, 102, 103 are disposed at the left edge. Examples of sensors are a camera, a laser or a radar sensor. In general, a sensor is a component or a physical unit that can produce input data. These sensors monitor the surroundings and periodically transmit redundant messages to the two redundant NSCFCUs 110, 111 at the beginning of a frame, by way of the communication channels 150. A frame is a periodically recurring segment on the time axis, the beginning of which is synchronized by way of the global time.

The messages of the sensor can contain input data for the NSCFCUs.

The NSCFCU 110 calculates a result by means of a deterministic software/algorithm, for example based on the message(s) or input data transmitted by the sensor(s); for example, the NSCFCU 110 performs fusion of the sensor data, which can be very complicated. After the result is available, the NSCFCU 110 calculates an end-to-end signature, by means of an algorithm known only to it and to the final recipient of the data, which signature is added to the result data, and forms a closed signed data packet, abbreviated CSDP, with this. This CSDP is sent to a relay unit 120 by way of a communication channel 160.

The NSCFCU 111 simultaneously performs the same operations as the NSCFCU 110, particularly based on the same message(s) or input data, and produces a second CSDP and transmits this second CSDP to the relay unit 120 by way of a communication channel 162.

In the failure-free case, the bit patterns of the two CSDPs are identical. If a failure occurs in one of the NSCFCUs, then the bit patterns of the two CSDPs are different.

The two CSDPs are transmitted to an SCFCU 130 by way of a communication channel 161, and, preferably with a time delay, to a transceiver 140 by way of a communication channel 163, by the relay unit 120. The transceiver 140 is the component that is responsible for sequential transmission and reception of the bit streams of a message on the transmission medium.

The SCFCU 130 compares the bit patterns of the two CSDPs. If the bit patterns of the two CSDPs differ from one another, the release signal, which goes by way of a line 170 to the transceiver 140, for example, is prevented, and the transceiver 140 subsequently interrupts transmission of messages on a line 165.

The time delay of the CSDP in the time-controlled distributor unit 120 ahead of the communication channel 163 to the transceiver 140 is determined by the time period that the SCFCU 130 needs to perform the comparison of the two CSDPs.

If only one CSDP arrives at the SCFCU 130 from the two NSCFCUs 110, 111, then preferably, the release signal on the line 170 is also prevented, and the transceiver 140 interrupts transmission of messages on the line 165.

If a failure occurs in the SCFCU 130, then the release signal on the line 170 fails to occur, and the transceiver 140 interrupts transmission of messages on the line 165.

In FIG. 2, combining the components into physical units is shown. Components 110 and 111 are situated in the physical unit 115; components 120, 130, and optionally also a component 119 are integrated into the physical unit 135.

The component 119 is a protocol converter that undertakes conversion between two different communication protocols, wherein the bit pattern in the CSDP is not changed within the scope of the conversion. For example, the protocol converter 119 can undertake conversion of the PCIe protocol to a TTEthernet protocol or conversion of the TTEthernet protocol to a CAN FD protocol.

The SCFCU 130 can transmit failure messages to a monitor component by way of a control line 167.

Fail-operational behavior of the real-time system can be implemented with two systems that work in parallel, as shown in FIG. 2. In this regard, such a system comprises the physical units 115 and 135, which each receive the input data—in the example shown, from the three sensors 101, 102, 103.

The method disclosed allows the use of high-performance and inexpensive SoCs of consumer electronics in safety-relevant systems. It is therefore of great economic importance.

CITED LITERATURE

[1] WO 2016/033629
[2] Kopetz, H. *Real-time Systems-Design Principles for Distributed Embedded Applications*. Springer Verlag, 2011.
[3] Constantinescu, C. *Trends and Challenges in VLSI Circuit Reliability*. IEEE Micro. Vol. 23, No. 4, pp. 14-19. July 2003.
[4] Anderson, D., Metze, G. *Design of totally self-checking check circuits for m-out-of-n codes*. IEEE Trans. on Computers. Vol. C-22, pp. 263-269. March 1973.
[5] Qualcomm. Snapdragon. URL: www.qualcomm.com/products/snapdragon, accessed on Jun. 16, 2015.

The invention claimed is:

1. A method for forcing fail-silent behavior of a periodically functioning distributed real-time computer system, which can be connected with one or more sensor(s) (101, 102, 103), the real-time computer system comprises at least two redundant NSCFCUs (non-self-checking fault-containment units), the method comprising:
   making available a global time by the distributed real-time computer system, which global time establishes a beginning of a frame;
   supplying the at least two redundant NSCFCUs (110, 111) with the same input data by the sensor(s) at the beginning of the frame;
   calculating by each of the at least two redundant NSCFCUs a result by a deterministic algorithm from the input data by the sensor(s);
   packing the result into a CSDP (closed signed data packet) with an end-to-end signature;
   transmitting the CSDPs of the at least two redundant NSCFCUs (110, 111) to an SCFCU (self-checking fault-containment unit) (130) at a tick of the global time that has been established a priori; and
   checking by the SCFCU (130) whether bit patterns of the received CSDPs are identical, and, if a disparity of the bit patterns is found, preventing further transmission of the CSDPs in which the disparity was found.

2. The method of claim 1, wherein the SCFCU (130) prevents further transmission of the other CSDP in the event that a CSDP is not received by one of the at least two redundant NSCFCUs (110, 111).

3. The method of claim 1, wherein the SCFCU (130) transmits a release signal to a transceiver (140) in the failure-free case by way of a control line (170), and, in the event of failure, shuts off or does not transmit the release signal, so that further transmission of the CSDPs to subsequent components by way of a communication channel (165) is prevented.

4. The method of claim 1, wherein in the event of failure of the SCFCU (130), further transmission of the CSDPs to the subsequent components is prevented.

5. The method of claim 3, wherein in the event of failure of the SCFCU (130) and thereby of the release signal on the control line (170), the transceiver (140) prevents further transmission of the CSDPs to the subsequent components by way of the communication channel (165) and transmission of the CSDPs to the subsequent components is prevented.

6. The method of claim 3, wherein a time-controlled message relay unit (120) delays output of the CSDPs to the transceiver (140) until the SCFCU (130) has completed the comparison of the redundant CSDPs.

7. The method of claim 1, wherein the SCFCU (130) transmits failure messages to a monitor component by way of a communication channel (167).

8. A periodically functioning distributed real-time computer system, which can be connected with one or more sensor(s) (101, 102, 103), the system comprising:

a global time is made available by the distributed real-time computer system, which global time establishes the beginning of a frame, wherein in order to force fail-silent behavior, the real-time computer system comprises at least two redundant NSCFCUs (110, 111) and an SCFCU (130), wherein each sensor (101, 102, 103) is connected with each of the at least two redundant NSCFCUs (110, 111) by way of at least one communication channel (150) in each instance, wherein the at least two redundant NSCFCUs (110, 111), which are supplied with the same input data by the sensor(s) at the beginning of the frame, are set up for calculating a result, in each instance, by a deterministic algorithm, packing the result into a CSDP (closed signed data packet) with an end-to-end signature, wherein the SCFCU (130) is set up for receiving the CSDPs of the at least two redundant NSCFCUs (110, 111) based on the same input data, and for checking whether the bit patterns of the received CSDPs are identical, and the SCFCU (130) is furthermore set up for preventing further transmission of the CSDPs if a disparity of the bit patterns was found of those CSDPs in which the disparity was found.

9. The real-time computer system of claim 8, further comprising a distributor unit (120), wherein at least one of the of the at least two redundant NSCFCUs (110) is connected with the distributor unit (120) by way of a communication channel (160), and at least one of the at least two redundant NSCFCUs (111) is connected with the distributor unit (120) by way of a further communication channel (162).

10. The real-time computer system of claim 9, further comprising a transceiver (140), wherein the distributor unit (120) is connected with the transceiver (140) by way of a communication channel (163), and with the SCFCU (130) by way of a communication channel (161), and wherein a control line (170) leads from the SCFCU (130) to the transceiver (140).

11. The real-time computer system of claim 9, wherein a protocol converter (119) is disposed in a communication channel (160), which connects the at least one of the at least two redundant NSCFCUs (110) with the distributor unit (120).

12. The real-time computer system of claim 10, wherein a protocol converter (119) is disposed in the communication channel (163), which connects the distributor unit (120) with the transceiver (140).

13. The real-time computer system of claim 8, wherein the at least two redundant NSCFCUs (110, 111) are combined in a physical unit (115).

14. The real-time computer system of claim 8, wherein the distributor unit (120), the SCFCU (130), and the protocol converter (119) are combined in a physical unit (135).

* * * * *